United States Patent

Matsushita

[11] Patent Number: 5,951,199
[45] Date of Patent: Sep. 14, 1999

[54] PAVEMENT MATERIAL

[75] Inventor: Seigo Matsushita, Ehime-ken, Japan

[73] Assignee: Matsushita Sangyo Corporation, Ehime-ken, Japan

[21] Appl. No.: 08/869,209

[22] Filed: Jun. 4, 1997

[30] Foreign Application Priority Data

Sep. 2, 1996 [JP] Japan .................................. 8-231869

[51] Int. Cl.⁶ .................................................. E01C 5/22
[52] U.S. Cl. .......................................................... 404/17
[58] Field of Search ........................... 404/17, 79; 65/33; 156/154

[56] References Cited

U.S. PATENT DOCUMENTS

| | | | |
|---|---|---|---|
| 3,907,582 | 9/1975 | Walter | 106/281 |
| 4,120,735 | 10/1978 | Smith | 108/84 |
| 4,997,485 | 3/1991 | Lamoni | 106/753 |
| 5,062,913 | 11/1991 | Owens et al. | 156/154 |
| 5,203,901 | 4/1993 | Suzuki et al. | 65/33 |
| 5,466,407 | 11/1995 | Downs et al. | 264/115 |
| 5,716,260 | 2/1998 | Griffin et al. | 451/87 |

*Primary Examiner*—Thomas B. Will
*Assistant Examiner*—Raymond W Addie
*Attorney, Agent, or Firm*—Nikaido Marmelstein Murray & Oram LLP

[57] ABSTRACT

There is provided a pavement material comprising an asphalt and several kinds of aggregates, characterized in that: at least one kind of aggregate is a slag obtained by performing slag-formation treatment on garbage incineration residues.

6 Claims, 1 Drawing Sheet

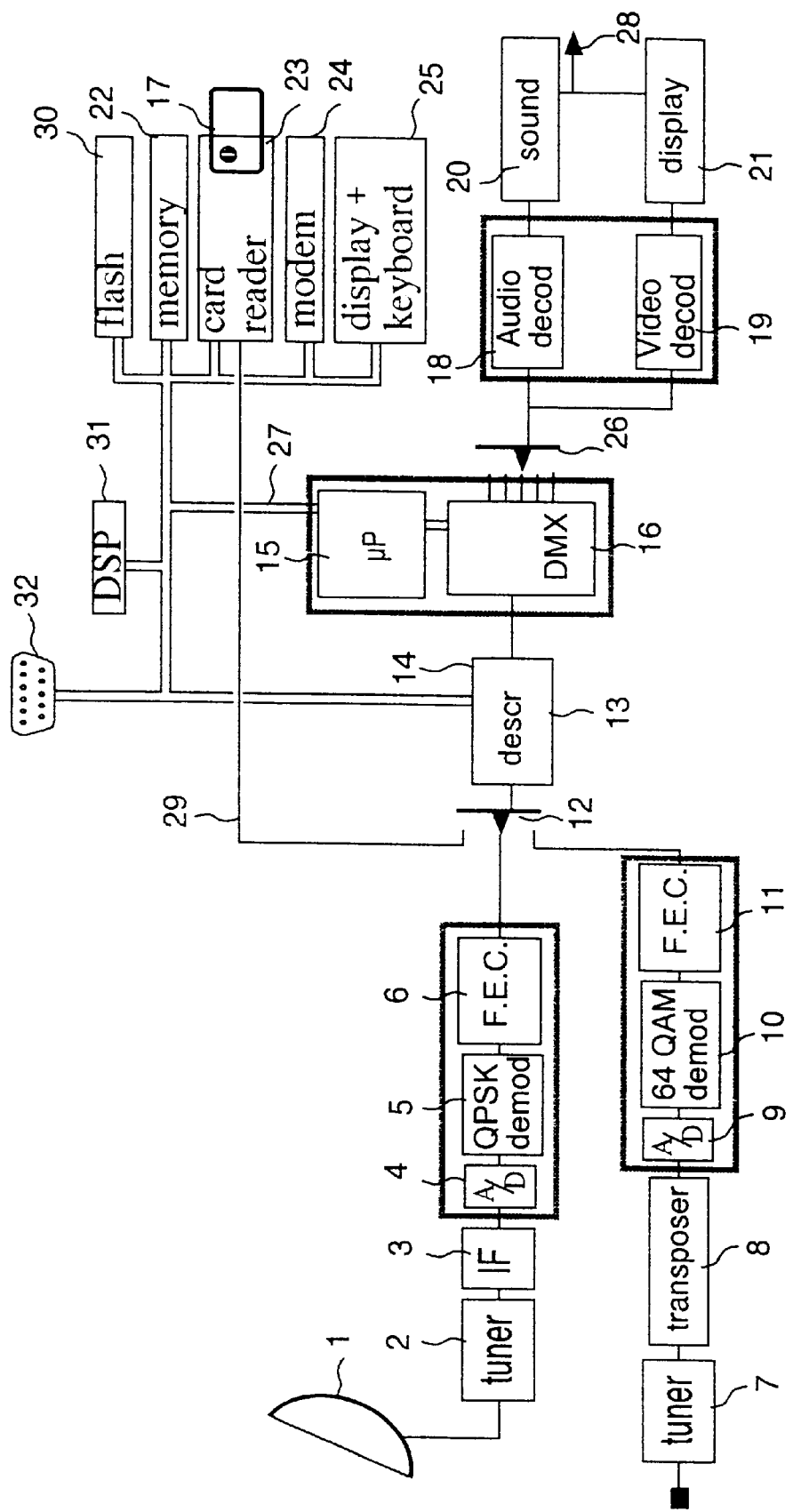

PAVEMENT MATERIAL

BACKGROUND OF THE INVENTION

The present invention relates to a pavement material, in particular to an asphalt pavement material used to construct or repair a road.

In prior art, an asphalt pavement material for the construction or the repairing of a road was usually a mixture containing an asphalt and several kinds of aggregates (including crushed stone, coarse sand and fine sand). If a color pavement is required, a kind of pigment having a desired color should also be added into the mixture. Further, if it is necessary to achieve a desired water penetrability throughout the pavement material, what people have to do is to select an appropriate size for the crushed stone, without having necessity to change the composition of the mixture (pavement material) itself.

However, since the above-mentioned aggregates (crushed stone, coarse sand and fine sand) are all taken from natural fields such as mountain, river, seaside), and since there is an increasingly growing needs for road construction, people begin to worry that these naturally obtainable materials will soon be used up in near future.

In order to solve the above problem, there has been suggested in Japanese Patent Application Laid-open No. 7-299440 that waste materials from construction fields be processed into aggregates which may be mixed with an asphalt to prepare an asphalt pavement material.

But, if the suggestion offered in Japanese Patent Application Laid-open No. 7-299440 is adopted, it is necessary to transport these construction waste materials from construction fields to a specific plant where a set of comparatively complex equipments and a relatively difficult technique are needed to carry out necessary treatment on the waste materials so as to produce an aggregate which has the same shape and property as a natural aggregate.

SUMMARY OF THE INVENTION

It is an object of the present invention to provide a new pavement material comprising an asphalt and several kinds of aggregates, in which at least one kind of aggregate is a slag obtained by performing slag-formation treatment on garbage incineration residues, so that natural aggregate can be saved to an extremely great extent, thus solving the above-mentioned problems peculiar to the above-mentioned prior art.

Thus, according to one aspect of the present invention, there is provided a pavement material comprising an asphalt and several kinds of aggregates, characterized in that at least one kind of aggregate is a slag obtained by performing slag-formation treatment on garbage incineration residues.

However, if a slag thus obtained is a water-granulated slag, it is suggested that said slag be further subjected to a heating/recrystallization treatment so as to produce a crystallized slag.

Then, the slag obtained from the above slag-formation treatment or from the above heating/recrystallization treatment is cooled gradually until its temperature drops to an ambient temperature.

Subsequently, the slag after being cooled to an ambient temperature are broken into smaller particles which are then passed through a screening machine so as to screen out slag particles having uniform size.

When preparing the pavement material according to the present invention, it is preferable that the pavement material comprise 5–6% by weight of an asphalt, 35–40% by weight of the above slag, with the remaining being other kinds of aggregate materials.

According to another aspect of the present invention, in preparing a pavement material, it is allowable that the above slag is mixed with a kind of glass cullet, a mixture obtained thereby is mixed with the asphalt so as to form the pavement material.

Further, the above kind of glass cullet may be processed to remove sharp and protruding portions of each cullet piece and is used as an aggregate to be mixed into a cement to manufacture a concrete pavement material.

The above objects and features of the present invention will become more understood from the following description with reference to the accompanying drawings.

BRIEF DESCRIPTION OF DRAWINGS

FIG. 1 is a block diagram of a flowchart indicating a process of producing a slag for use as an aggregate to be mixed into a pavement material of the present invention.

DETAILED DESCRIPTION OF THE PREFERRED EMBODIMENTS

Referring to FIG. 1 showing a process of producing a slag according to the present invention, a starting raw material is garbage incineration residues from garbage incinerator. The whole process may be described as follows.

In step (a), the garbage incineration residues from a garbage incinerator are fed into a melting furnace (such as a plasma melting furnace or an arc melting furnace) to be melt under a temperature of 1400–1500° C. In the melting furnace, the garbage incineration residues are melted into a magma state. Then, with the cooling of the melted residues, a kind of slag is formed. In this step, since an extremely high temperature of 1400–1500° C. is employed, some metallic components may be eluted therefrom so as to prevent a possible corrosion which may occur in future in pavement material.

In step (b), if a slag thus obtained is a water-granulated slag, such a slag is further subjected to a heating/recrystallization treatment. In this step, the slag material is heated again so as to effect a recrystallization which is useful for obtaining a high intensity slag material. In practice, the operation of step (b) shall be conducted under a temperature of about 1000° C. for about 3 hours.

In step (c), a slow and gradual cooling treatment is performed on the slag material obtained in step (a) or step (b) until its temperature drops to an ambient temperature.

In step (d), the slag materials from the above cooling treatment are broken in a shredding machine into smaller particles which are then passed through a screening machine so as to screen out slag particles having uniform size.

Up to this, a slag material for use as an aggregate in a pavement material was obtained, the detailed parameters of which are indicated in the following Table 1, as compared with allowable standard ranges.

TABLE 1

Parameter Comparison between Slag of the Invention and Allowable Standard Ranges

|  | Slag of the Invention | Allowable Standard Ranges |
| --- | --- | --- |
| Washing Reduction | 0.01 % | 1.0% or less |
| Specific Gravity in Absolute Dry Condition | 2.72 | 2.5 or more |
| Specific Gravity in Saturated Dry Condition | 2.75 | — |
| Coefficient of Water Absorption | 0.61 % | 3% or less |
| Stripping Reduction | 22.8 % | 40% or less |

It is understood from the above Table 1 that, the related parameters of the slag obtained in the above process according to the present invention, are well within the allowable standard ranges.

In addition, a test of eluting heavy metal components from the above slag was also conducted, with the test results listed in the following Table 2.

TABLE 2

Results of Test for Eluting Heavy Metal Components

|  | Slag of the Invention | Allowable Standard Ranges |
| --- | --- | --- |
| Mercury | <0.001 | 0.005 |
| Cadmium | <0.03 | 0.30 |
| Lead | <0.05 | 3.00 |
| Hexahydric Chrome | <0.6 | 1.50 |

It is understood from the above Table 2 that, the amounts of the heavy metal components eluted from the slag material obtained in the above process, are well below the allowable standard values.

Preparation of Asphalt Pavement Material

In preparing the asphalt pavement material according to the present invention, a preferred example is that said asphalt pavement material contains 5–6% by weight of an asphalt, 35–40% by weight of the above slag material, with the remaining being other kinds of aggregate materials (coarse is 8.5% by weight, fine sand is 8.5% by weight, stone powder is 4.7% by weight, crushed stone No. 6 (Japanese Industrial Standard) is 25.5% by weight, crushed stone No. 7 (Japanese Industrial Standard) is 9.5% by weight).

Further, a kind of glass cullet may be used as one more aggregate material in the asphalt pavement material. In such a case, the glass cullet may be obtained by breaking waste glass materials in a shredding machine to form multi-surface glass beeds having a diameter of about 10 mm. In practice, the above slag may be first mixed with the glass cullet, a mixture obtained thereby is then mixed with the asphalt so as to form the pavement material. After an asphalt pavement material containing a glass cullet as an aggregate material is paved on a road, a sufficiently great pressure is then applied onto the road surface with the use of a huge roller, so that sharp and protruding portions of each cullet piece will be removed, therefore they are no longer dangerous to any person walking on it or tires of a motor vehicle running therethrough. Since part of each cullet piece will be exposed to road surface, the road surface will glisten to some extent, thereby greatly improving the appearance and identifiability of a road.

In addition, the above kind of glass cullet may be in advance treated to remove sharp and protruding portions of each cullet piece (by passing the glass cullet through an equipment including cyclone dust collector and a bag filter), and is then used as an aggregate to be mixed into a cement to manufacture a concrete pavement material.

In detail, a concrete pavement material may be made by adding and mixing together a cement, a sand, water, and the kind of glass cullet as treated above. For example, the concrete pavement material may be made by adding and mixing together 464 parts by weight of a cement, 286 parts by weight of a sand, 290 parts by weight of water, and 1.145 parts by weight of the above treated glass cullet.

As a final product, the concrete pavement material may be made into a block or tile form. Further, the concrete pavement material in a block or tile form is abraded and polished on one of its surfaces which is to serve as road or floor surface, thereby improving its appearance and identifiability.

While the presently preferred embodiments of the this invention have been shown and described above, it is to be understood that these disclosures are for the purpose of illustration and that various changes and modifications may be made without departing from the scope of the invention as set forth in the appended claims.

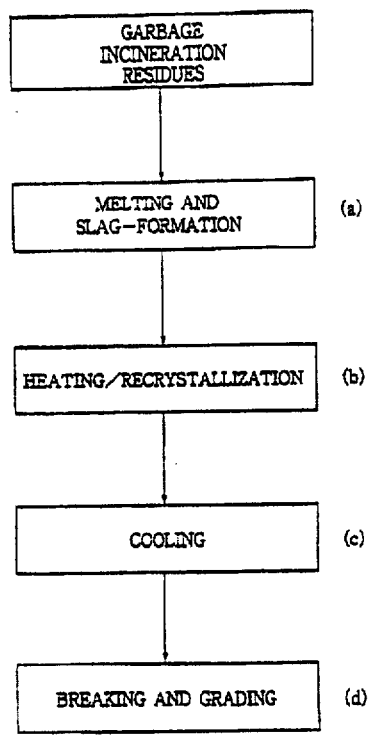

What is claimed is:

1. A pavement material comprising an asphalt and several kinds of aggregates, wherein said at least one kind of said aggregates are recrystallized slag particles obtained by a process comprising the following steps:
treating garbage incineration residues to produce a slag;
heating and recrystallizing said slag to form a recrystallized slag;
cooling said recrystallized slag gradually until a temperature of said recrystallized slag drops to an ambient temperature to produce a cooled slag;
breaking the cooled slag into slag particles; and thereafter
screening the slag particles to produce recrystallized slag particles of a uniform size.

2. A pavement material according to claim 1, comprising 5–6% by weight of an asphalt, 35–40% by weight of said recrystallized slag particles, with the remaining being other kinds of aggregate materials.

3. A pavement material according to claim 1, further comprising a kind of glass cullet.

4. A pavement material according to claim 3, which pavement material is produced by a proposes comprising the following steps:
mixing said glass cullet with the recrystallized slag particles to obtain a mixture; and then
mixing said mixture with the asphalt to form the pavement material.

5. A pavement material according to claim 4, wherein the pavement material is applied to a predetermined site and pressure is applied onto the pavement material to remove sharp and protruding portions of said glass cullet.

6. A pavement material according to claim 3, further comprising cement, wherein said glass cullet is pretreated to remove sharp and protruding portions.

* * * * *

UNITED STATES PATENT AND TRADEMARK OFFICE
CERTIFICATE OF CORRECTION

PATENT NO. : 5,951,199
DATED : September 14, 1999
INVENTOR(S) : Seigo Matsushita It is certified that error appears in the above-identified patent and that said Letters Patent is hereby corrected as shown below:

The title page, should be deleted to appear as per attached title page.

The sheet of drawing consisting of figure 1, should be deleted to appear as per attached sheet.

Signed and Sealed this

Twenty-sixth Day of September, 2000

Attest:

Q. TODD DICKINSON

*Attesting Officer*  *Director of Patents and Trademarks*

United States Patent [19]
Matsushita

[11] Patent Number: 5,951,199
[45] Date of Patent: Sep. 14, 1999

[54] PAVEMENT MATERIAL

[75] Inventor: Seigo Matsushita, Ehime-ken, Japan

[73] Assignee: Matsushita Sangyo Corporation, Ehime-ken, Japan

[21] Appl. No.: 08/869,209

[22] Filed: Jun. 4, 1997

[30] Foreign Application Priority Data

Sep. 2, 1996 [JP] Japan .................... 8-231869

[51] Int. Cl.$^6$ .................... E01C 5/22
[52] U.S. Cl. .................... 404/17
[58] Field of Search .................... 404/17, 79; 65/33; 156/154

[56] References Cited

U.S. PATENT DOCUMENTS

| | | | |
|---|---|---|---|
| 3,907,582 | 9/1975 | Walter | 106/281 |
| 4,120,735 | 10/1978 | Smith | 108/84 |
| 4,997,485 | 3/1991 | Lamoni | 106/753 |
| 5,062,913 | 11/1991 | Owens et al. | 156/154 |
| 5,203,901 | 4/1993 | Suzuki et al. | 65/33 |
| 5,466,407 | 11/1995 | Downs et al. | 264/115 |
| 5,716,260 | 2/1998 | Griffin et al. | 451/87 |

*Primary Examiner*—Thomas B. Will
*Assistant Examiner*—Raymond W Addie
*Attorney, Agent, or Firm*—Nikaido Marmelstein Murray & Oram LLP

[57] ABSTRACT

There is provided a pavement material comprising an asphalt and several kinds of aggregates, characterized in that: at least one kind of aggregate is a slag obtained by performing slag-formation treatment on garbage incineration residues.

6 Claims, 1 Drawing Sheet

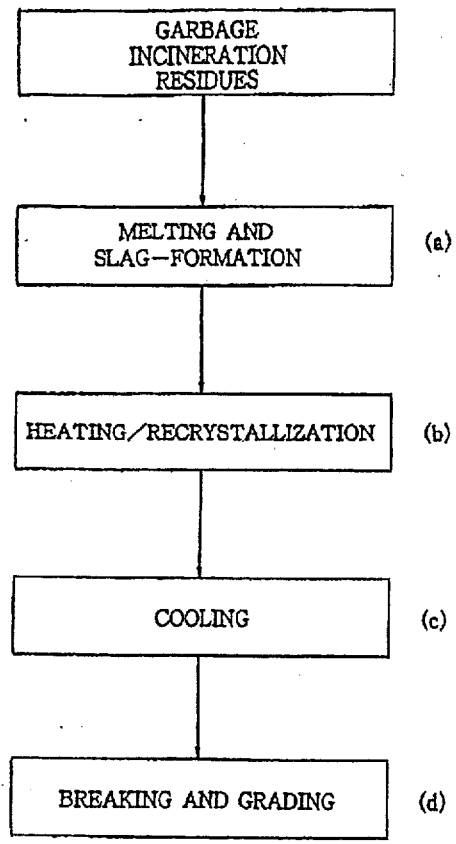

UNITED STATES PATENT AND TRADEMARK OFFICE
CERTIFICATE OF CORRECTION

PATENT NO. : 5,951,199
DATED : September 14, 1999
INVENTOR(S) : Matsushita

Page 3 of 3

It is certified that error appears in the above-identified patent and that said Letters Patent is hereby corrected as shown below:

Please delete Figure 1, and insert therefor, -- Figure 1 as shown below --: